United States Patent [19]

Führing

[11] Patent Number: 4,850,119
[45] Date of Patent: Jul. 25, 1989

[54] APPARATUS FOR THE RECOVERY OF SOLVENT VAPOR FROM AN AIR STREAM

[75] Inventor: Heinrich Führing, Augsburg, Fed. Rep. of Germany

[73] Assignee: Bowe Reinigungstechnik GmbH, Augsburg, Fed. Rep. of Germany

[21] Appl. No.: 229,830

[22] Filed: Aug. 8, 1988

[30] Foreign Application Priority Data

Aug. 7, 1987 [DE] Fed. Rep. of Germany ....... 3726245

[51] Int. Cl.⁴ .............................................. F26B 21/06
[52] U.S. Cl. ............................................ 34/77; 34/80; 34/27; 68/18 C; 68/18 F
[58] Field of Search ................. 68/18 C, 18 F; 34/77, 34/74, 80

[56] References Cited

U.S. PATENT DOCUMENTS

| 4,074,984 | 2/1978 | Fuhring. | |
|---|---|---|---|
| 4,251,923 | 2/1981 | Kuri. | |
| 4,282,015 | 8/1981 | Bartoschek et al.. | |
| 4,769,921 | 9/1988 | Kabakov et al. | 68/18 C X |

FOREIGN PATENT DOCUMENTS

| 2214153 | 8/1976 | Fed. Rep. of Germany. |
|---|---|---|
| 3412007 | 10/1985 | Fed. Rep. of Germany. |
| 3609587 | 4/1986 | Fed. Rep. of Germany. |

Primary Examiner—Henry A. Bennet
Assistant Examiner—John Sollecito
Attorney, Agent, or Firm—Herbert Dubno

[57] ABSTRACT

An apparatus for recovery of a solvent gas involved in the drying of goods treated with an organic solvent with the aid of an air stream in a dry-cleaning machine. In this machine the goods are dried by an air flow circulating in a closed circulation loop which is heated before contact with the goods and after contact is again cooled for condensation of solvent vapor. In a second stage of the recovery, the socalled reduction stage, the goods are cooled by shutting off the heat. For recovery of the residual solvent vapor still remaining in the air after cooling the air stream is subsequently fed through an adsorption unit. During the cooling only a portion of the cooled air is supplied for adsorption and after that is fed back in the air circulation loop circulating over the goods. This has been accomplished by providing a circulation branch having an adsorption unit substantially parallel to a portion of the circulation loop and an additional blower. The pipe connected with the entrance of the adsorption unit guiding the flow from this second blower is connectable to the circulation loop downstream of the air cooler in the vicinity of the entrance of the air stream to the processing container.

7 Claims, 1 Drawing Sheet

APPARATUS FOR THE RECOVERY OF SOLVENT VAPOR FROM AN AIR STREAM

FIELD OF THE INVENTION

My present invention relates to a method of and an apparatus for the recovery of solvent vapor from an air stream and, more particularly, for recovery of solvent vapor from an air stream of a dry-cleaning unit.

BACKGROUND OF THE INVENTION

German Patent No. 36 09 587 describes an apparatus for the recovery of solvent vapor from an air stream in a machine for treating fabric with an organic solvent in which a closed circulation loop runs from a processing container receiving the articles to be treated through an air cooler and an air heater back to the processing container.

A blower is provided to circulate the air stream and an adsorption unit is connectable by a plurality of pipes to the circulation loop to form a circulation branch substantially parallel to a portion of the circulation loop. The goods to be treated can be many different kinds, e.g. textiles in the case of dry cleaning, workpieces, electronic components and so forth in the case of degreasing, etc. As solvents fluorinated or chlorinated hydrocarbons, e.g. perchloroethylene, are common.

Upon drying of the goods in this apparatus the last residue of solvent gas is removed by adsorption from the air stream circulating over the goods in a closed circulation loop.

The regeneration of the adsorption unit required is effected with hot air in a closed circulation loop with the help of the air heater and air cooler present in the air shaft of the cleaning machine. The cost of the several space-consuming bypass pipes of this system is disadvantageous. Also the air shaft of the machine must be shut off from the container during each washing process with appropriately large shut off valves so that in washing solvent vapor welling up from the processing container is not forced into the desorption cycle occurring at this time.

In the known arrangement according to German Patent No. 214,153 and German Patent No. 34 12 007 it is disadvantageous that during the adsorption stage before admission to the adsorption unit the air must flow through an air heater so that the adsorber itself on shutting off the air heater as a result of thermal inertia is exposed to correspondingly heated air flowing through it and its adsorption capacity is reduced and/or it must be built correspondingly larger. The apparatus according to U.S. Pat. No. 4,251,923 has a gas recovery device comprising two adsorbers operating alternately.

OBJECTS OF THE INVENTION

It is an object of my invention to provide an improved apparatus for recovery of solvent gas from an air stream in which in contrast to those currently known the abovementioned disadvantages are avoided and a suitable design which results in as small an expense as possible is attained.

It is also an object of my invention to provide an improved apparatus for recovery of solvent gas from an air stream, in which the adsorption unit can be more compact but an effective recovery of the small solvent gas residue can still be attained.

SUMMARY OF THE INVENTION

According to my invention another blower is provided in the circulation branch having the adsorption unit and one of the pipes connected with the entrance to the adsorption unit guiding the flow provided by the other blower is connectable to the circulation loop after or downstream of the air cooler in the vicinity of the entrance of the air stream to the processing container.

According to the adjustment of the additional blower in my invention only a portion of the air flowing through the air cooler is fed through the adsorption unit so that, when at the beginning of the recovery the solvent gas concentration is comparatively high in the circulating air stream, an overloading of the adsorber is avoided and it can be built correspondingly smaller. The pipe to the adsorption unit can be directly connected to the circulation loop between the air cooler outlet and the air heater entrance so that as a result of cooling of the air an efficient adsorption is attained.

It is also possible however to connect the pipe to the adsorption unit directly to the container entrance during the adsorption while the heater is shut off or bypassed. This variant permits a regeneration of the adsorption unit with hot air in a closed circulation loop using the air cooler and the air heater in the air shaft of the machine. It is however especially desirable when the air heater is bypassed by a bypass pipe since then the connection of the pipe leading to the adsorption device is directly to the air cooler outlet. Advantageously the circulation branch having the adsorption unit is formed so that it can be shut off from the main circulation loop.

To attain the strongest cooling possible the outlet of the adsorption unit is connected to the circulation loop upstream of the air cooler. It is also advantageous to connect the outlet of the adsorption unit at least temporarily to the circulation loop downstream of the air cooler, when the air cooler gradually frosts up with ever stronger cooling in the course of the recovery and the solvent frozen on the cool surface begins to vaporize again, so that the frosted condenser is bypassed by the partial air flow through the adsorber.

It is advantageous for the charging and discharging of the cleaning machine to connect the pipe connected with the entrance of the adsorption unit directly to the processing container, preferably to the circulating loop in the vicinity of the loading door of the processing container.

Complementing the abovementioned features the pipe communicating with the entrance of the adsorption unit is connectable to the circulating loop, especially in a region between the processing container and the blower so that as in the previously known device an adsorption circulation loop guided through the processing container can be produced as required.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
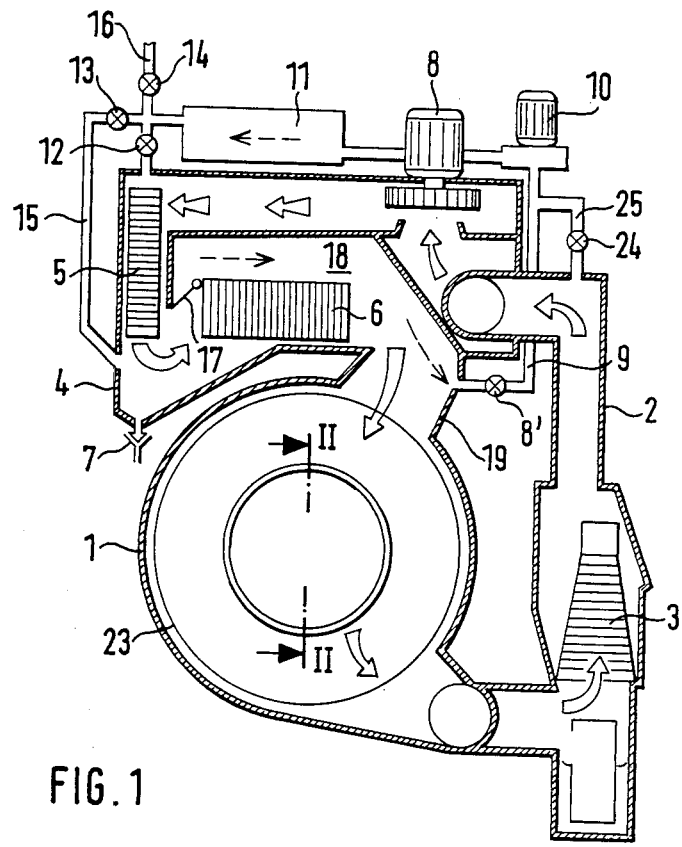
FIG. 1 is a diagrammatic view of one embodiment of the dry-cleaning machine with a pipe system according to my invention.

The drum housing 1 of a dry-cleaning machine used as a processing container is shown in FIG. 1. In the drum housing 1 a rotatable drum 23 in which the goods to be treated are placed is mounted in a known way.

A suction duct 2 draws air and solvent vapor over a lint filter 3 and is connected to the drum housing 1. This duct leads to an air shaft 4 which contains an air cooler 5 and an air heater 4. This air shaft 4 forms together with the suction duct 2 a closed circulation loop. An outlet 7 is provided for the condensed or separated water.

The air circulation path indicated by the thick arrows in FIG. 1 is formed following the usual washing and agitation processes, used to dry the goods located in the drum housing 1, is produced by a blower 8 which is provided in the air shaft 4. In a known way the goods are dried by this air circulation loop with heated air from the air heater 6 and the solvent removed from the goods and the drum housing 1 is fed to the air cooler 5 and there is recovered by condensation.

In the vicinity of the entrance of the drum housing 1, bypass pipe 9, which can be shut-off by a bypass valve 8' and which leads to the entrance or drawing side of another blower 10, is connected to the air shaft 4.

This bypass pipe 9 is connected directly on the pipe connector 19 (for the air shaft 4) of the drum housing 1. The upstream or outlet side of the other blower 10 leads to the entrance of an absorption unit 11 whose outlet is connectable selectively with the aid of the valves 12, 13 or 14 to the entrance of the air cooler 5 or by another pipe 15 to the outlet of the air cooler 5 or to an additional pipe 16 leading to the surroundings or the exterior.

In the air shaft 4, further, a shunting valve or flap 17 is provided which closes off the air heater 6 and separates it from the path of the air circulation and opens a bypass line 18 which bypasses the heater 6.

The usual drying of the goods by heated air is followed by the so called reduction stage in which the air heater 6 is shut off and/or—as in the indicated example—flow is bypassed through the bypass duct 18 so that the goods heated previously by the air flow are gradually cooled. During this reduction stage by opening the valves 8' and 12 or 13 when the air cooler 5 is frozen or iced a portion of the cooled air is guided over the adsorption unit 11 by turning on the blower 10 (dashed arrows in FIG. 1). By suitable adjustment of the power supplied to the blowers 8 and 10 a chosen fraction of the cooled air flow can occur through the adsorption unit 11 and the drum housing 1 so that a portion of the solvent vapor drawn from the goods can be condensed.

On unloading after opening of the valve 14, the air drawn through the open loading door by the blower 10 is forced through the pipe 16 into the surroundings. Thus because of the connection of the pipe 9 leading to the entrance of the adsorption unit 11 in the vicinity of the drum entrance, especially to the entrance pipe connector 19 (for the air shaft 4), discharge of the solvent-containing air from the drum housing 1 is advantageously prevented.

In most machines the entrance pipe connector 19 is known to lead to the inside of the front wall 20 of the drum housing 1 and is a flat duct with a small rectangular shape cross section leading up to the edge of the loading door opening 21.

Figure 2:
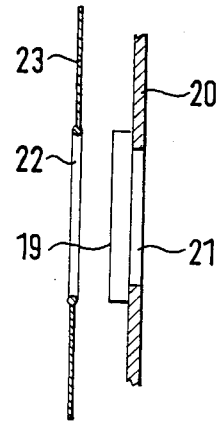
FIG. 2 is a cross sectional view of a portion of the dry-cleaning machine taken along the line II—II of FIG. 1.

A corresponding opening 22 is found in the front wall of the drum 23 (FIG. 2). Thus an air flow running substantially transversely to the loading opening is produced in the opening of the loading door by the other blower 10. This has the effect of producing an air curtain extending over the opening while the air mass is only slightly moved in the interior of the housing. As required the pipe 9 can be directly connected in the vicinity of the loading opening to the processing container.

In this arrangement still another pipe 25, connectable with the pipe 2 through a valve 24, is provided which similarly leads to the entrance side of the other blower 10 so that additionally an adsorption circulation path leading through the drum housing 1 is provided as required to allow as versatile as possible a use of the adsorption unit 11.

My invention is not intended to be limited to the details provided above in this specification and it will be understood that various omissions, modifications, substitutions and changes in the forms and details of the apparatus illustrated and in its operation can be made by those skilled in the art without departing in any way from the spirit of my invention as defined in the subsequent claims.

The processing container referred to in the claims below comprises the drum housing 1.

I claim:

1. In an apparatus for recovery of solvent vapor from an air stream comprising a machine for processing goods with an organic solvent in which a closed circulation loop which runs from a processing container, receiving said goods, through an air cooler and an air heater back to said processing container is provided with a blower to circulate said air stream and in which an adsorption unit is connectable by a plurality of pipes to said circulation loop to form a circulation branch substantially parallel with a portion of said circulation loop, the improvement wherein another of said blowers is provided in said circulation branch having said adsorption unit and the one of said pipes connected with the entrance to said adsorption unit guiding the flow provided by said other blower is connectable to said circulation loop downstream of said air cooler in the vicinity of the entrance to said processing container for said air stream, the outlet of said adsorption unit being connectable to said circulation loop upstream of said air cooler adjacent the entrance to said air cooler.

2. The improvement according to claim 1 wherein said air heater is bypassable by a bypass pipe.

3. The improvement according to claim 1 wherein said circulation branch having said adsorption unit is disconnectable from said circulation loop.

4. The improvement according to claim 1 wherein the outlet of said adsorption unit is connectable to said circulation loop downstream of said air cooler.

5. The improvement according to claim 1 wherein said one of said pipes connected with said entrance of said adsorption device is connectable directly to said processing container.

6. The improvement according to claim 5 wherein said one of said pipes is connected to said circulation loop in the vicinity of said loading door of said processing container.

7. The improvement according to claim 1 wherein said one of said pipes connected with said entrance of said adsorption device is connectable to said circulation loop between said processing container and said blower.

* * * * *